US008813546B2

(12) United States Patent
Takahashi et al.

(10) Patent No.: US 8,813,546 B2
(45) Date of Patent: Aug. 26, 2014

(54) NOX SENSOR DIAGNOSIS DEVICE AND SELECTIVE CATALYTIC REDUCTION SYSTEM

(75) Inventors: Hirotaka Takahashi, Fujisawa (JP); Masashi Mizutani, Fujisawa (JP); Takanobu Ogawa, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 13/808,435

(22) PCT Filed: Jul. 7, 2011

(86) PCT No.: PCT/JP2011/065556
§ 371 (c)(1),
(2), (4) Date: Jan. 4, 2013

(87) PCT Pub. No.: WO2012/005321
PCT Pub. Date: Jan. 12, 2012

(65) Prior Publication Data
US 2013/0104638 A1    May 2, 2013

(30) Foreign Application Priority Data
Jul. 8, 2010 (JP) ................. 2010-155554

(51) Int. Cl.
*G01M 15/10* (2006.01)
*F01N 3/20* (2006.01)
*F02D 41/14* (2006.01)
*F01N 9/00* (2006.01)
*F01N 3/035* (2006.01)

(52) U.S. Cl.
CPC ........... *G01M 15/10* (2013.01); *F02D 41/1461* (2013.01); *F02D 41/1463* (2013.01); *F01N 3/208* (2013.01); *F01N 9/002* (2013.01); *Y02T 10/24* (2013.01); *F01N 3/035* (2013.01); *F01N 2560/026* (2013.01)
USPC ..................................... 73/114.71; 73/114.75

(58) Field of Classification Search
CPC . F01N 2560/026; F01N 11/007; F01N 11/00; F02D 41/222
USPC .......................................... 73/114.71, 114.75
See application file for complete search history.

(56) References Cited

U.S. PATENT DOCUMENTS 7,801,670 B2 *  9/2010  Richardson et al. .......... 701/109
7,921,706 B2 *  4/2011  Sumitani .................... 73/114.69

(Continued)

FOREIGN PATENT DOCUMENTS

EP      2128396 A1 * 12/2009  ............. F02D 41/22
JP    2000-303826     10/2000

(Continued)

OTHER PUBLICATIONS

International Preliminary Report on Patentability mailed Feb. 12, 2013 for corresponding International Application No. PCT/JP2011/065556.

(Continued)

*Primary Examiner* — Freddie Kirkland, III
(74) *Attorney, Agent, or Firm* — Staas & Halsey LLP

(57) ABSTRACT

A NOx sensor diagnosis device which can diagnose validity of a NOx sensor by considering an environmental condition and can prevent erroneous diagnosis, and a selective catalytic reduction system are provided. The device provided in an exhaust pipe of an engine E and diagnosing a NOx sensor that detects NOx concentration in an exhaust gas, a diagnosis prohibition determination unit is provided that prohibits diagnosis of the NOx sensor during diesel particulate filter regeneration, during power take-off operation or during exhaust brake operation.

8 Claims, 3 Drawing Sheets

(56) References Cited

U.S. PATENT DOCUMENTS

| | | | |
|---|---|---|---|
| 8,307,699 B2* | 11/2012 | Sawada et al. | 73/114.75 |
| 8,359,826 B2* | 1/2013 | Kitazawa | 60/277 |
| 2010/0024520 A1* | 2/2010 | Sawada et al. | 73/23.31 |
| 2010/0031633 A1* | 2/2010 | Kitazawa | 60/276 |
| 2011/0000290 A1* | 1/2011 | Sawada et al. | 73/114.75 |
| 2012/0304744 A1* | 12/2012 | Takahashi et al. | 73/61.43 |
| 2013/0060486 A1* | 3/2013 | Takahashi et al. | 702/24 |

FOREIGN PATENT DOCUMENTS

| | | |
|---|---|---|
| JP | 2008-133780 | 6/2008 |
| JP | 2009-128237 | 6/2009 |
| JP | 2009-257888 | 11/2009 |
| JP | 2010-107227 | 5/2010 |
| JP | 2010107227 A * | 5/2010 |

OTHER PUBLICATIONS

Written Opinion of the International Searching Authority mailed Aug. 23, 2011 for corresponding International Application No. PCT/JP2011/065556.

International Search Report of Corresponding PCT Application PCT/JP2011/065556 mailed Aug. 23, 2011.

Patent Abstracts of Japan, Publication No. 2009-257888, Published Nov. 5, 2009.

Patent Abstracts of Japan, Publication No. 2010-107227, Published May 13, 2010.

Patent Abstracts of Japan, Publication No. 2008-133780, Published Jun. 12, 2008.

Patent Abstracts of Japan, Publication No. 2009-128237, Published Jun. 11, 2009.

Patent Abstracts of Japan, Publication No. 2000-303826, Published Oct. 31, 2000.

* cited by examiner

NOX SENSOR DIAGNOSIS DEVICE AND SELECTIVE CATALYTIC REDUCTION SYSTEM

CROSS-REFERENCE TO RELATED APPLICATIONS

This application claims the benefit of Japanese Patent Application No. 2010-155554, filed on Jul. 8, 2010, the contents of which is incorporated herein by reference, which serves as priority for PCT Application No. PCT/JP2011/065556, filed by Jul. 7, 2011.

TECHNICAL FIELD

The present invention relates to a NOx sensor diagnosis device that diagnoses validity of a NOx sensor and a selective catalytic reduction ("SCR") system.

BACKGROUND ART

As an exhaust gas purification system for purifying $NO_x$ in an exhaust gas from a diesel engine, an SCR system using an SCR device has been developed.

The SCR system supplies urea water to an exhaust gas upstream of the SCR device to generate ammonia using heat of the exhaust gas, and using the ammonia, reduces NOx on an SCR catalyst to purify NOx (see, for example, patent literature 1).

In the SCR system, injection of urea water is controlled in accordance with a NOx concentration in the exhaust gas. For this control, a NOx sensor is provided in an exhaust pipe.

If a detected value of this NOx sensor is not valid, the injection of urea water cannot be controlled appropriately, and thus, in the SCR system, a NOx sensor diagnosis device is provided for diagnosing validity of the NOx sensor.

In a prior-art NOx sensor diagnosis device, if a difference between a calculated value of the NOx concentration determined in accordance with an operation state of an engine and a detected value of the NOx concentration detected by the NOx sensor becomes larger than a predetermined threshold value, it is diagnosed that abnormality occurs in the NOx sensor (see, for example, patent literature 2).

PRIOR ART DOCUMENTS

Patent Document 1: Japanese Patent Application Publication No. 2000-303826
Patent Document 2: Japanese Patent Application Publication No. 2009-128237
Patent Document 3: Japanese Patent Application Publication No. 2009-257888

However, during regeneration of a diesel particulate filter ("DPF"), during operation of a power take-off ("PTO") or during operation of an exhaust brake, an exhaust gas flow rate or the NOx concentration in the exhaust gas changes rapidly, and thus, the NOx sensor might not operate normally. Thus, if the NOx sensor is diagnosed in such a situation, the difference between the calculated value and the detected value of the NOx concentration becomes large, and there is a concern that erroneous diagnosis is made that the NOx sensor is abnormal despite no abnormality in the NOx sensor.

SUMMARY OF THE INVENTION

The present invention has an object to solve the above problem and to provide a NOx sensor diagnosis device which can prevent erroneous diagnosis and an SCR system.

The present invention has been made in order to achieve the above object, and provides, in a NOx sensor diagnosis device which is provided in an exhaust pipe of an engine and diagnoses a NOx sensor for detecting a NOx concentration in an exhaust gas, a NOx sensor diagnosis device provided with a diagnosis prohibition determination unit that prohibits diagnosis of the NOx sensor when at least one of diesel particulate filter regeneration, power take-off operation and exhaust brake operation is detected.

A calculated value calculation unit that acquires a calculated value of the NOx concentration in the exhaust gas on the basis of an operation state of the engine and an abnormality determination unit that determines that the NOx sensor is abnormal if a difference between the calculated value of the NOx concentration acquired by the calculated value calculation unit and a detected value of the NOx concentration detected by the NOx sensor becomes larger than a threshold value for determination are preferably provided.

Moreover, the present invention is, in an SCR system provided with an SCR (selective catalytic reduction) device provided in an exhaust pipe of an engine, a dosing valve that injects urea water on the upstream side of the SCR device, the NOx sensor provided on the upstream side of the SCR device, a urea water injection control unit that controls an injected quantity of urea water in accordance with a detected value of the NOx concentration detected by the NOx sensor, and a NOx sensor diagnosis device that diagnoses the NOx sensor, the NOx sensor diagnosis device is an SCR system provided with a diagnosis prohibition determination unit that prohibits diagnosis of the NOx sensor if at least one of diesel particulate filter regeneration, power take-off operation, and exhaust brake operation is detected.

The NOx sensor diagnosis device may include a calculated value calculation unit that acquires a calculated value of the NOx concentration in the exhaust gas on the basis of the operation state of the engine and an abnormality determination unit that determines that the NOx sensor is abnormal if a difference between the calculated value of the NOx concentration acquired by the calculated value calculation unit and the detected value of the NOx concentration detected by the NOx sensor becomes larger than a threshold value for determination.

Effects of the Invention

The present invention provides a NOx sensor diagnosis device that can prevent erroneous diagnosis and an SCR system.

DESCRIPTION OF THE EMBODIMENT

Embodiments of the present invention will be described below with reference to the drawings.

First, an SCR system to be installed in a vehicle will be described.

Figure 1A:
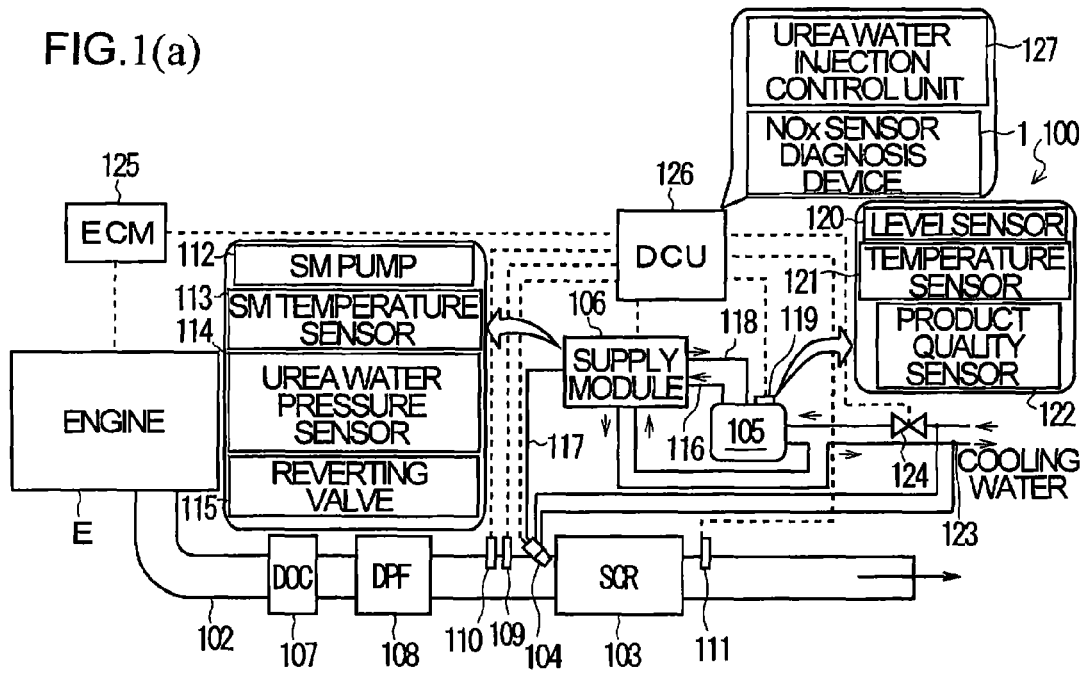
FIG. 1(a) is a schematic configuration diagram of an SCR system provided with a NOx sensor diagnosis device according to one embodiment of the present invention and FIG. 1(b) is a configuration diagram of the NOx sensor diagnosis device.

As illustrated in FIG. 1(a), an SCR system 100 mainly includes: an SCR device 103 provided in an exhaust pipe 102 for an engine E; a dosing valve (urea injection device or dosing module) 104 that injects urea water on the upstream side of the SCR device 103 (upstream side of an exhaust gas); a urea tank 105 that stores urea water; a supply module 106 that supplies urea water stored in the urea tank 105 to the dosing valve 104, and a DCU (dosing control unit) 126 that controls, e.g., the dosing valve 104 and the supply module 106.

In the exhaust pipe 102 for the engine E, a diesel oxidation catalyst ("DOC") 107, a DPF 108 and the SCR device 103 are sequentially disposed from the upstream side to the downstream side of an exhaust gas. The DOC 107 is provided to oxidize NO in an exhaust gas emitted from the engine E to $NO_2$ to control a ratio between NO and $NO_2$ in the exhaust gas for enhancement in denitration efficiency of the SCR device 103. Also, the DPF 108 is provided to collect particulate matter ("PM") in the exhaust gas.

In the exhaust pipe 102 on the upstream side of the SCR device 103, the dosing valve 104 is provided. The dosing valve 104 has a structure in which a cylinder filled with high-pressure urea water is provided with an injection orifice and a valving element occluding the injection orifice is attached to a plunger, and upon energization of a coil to pull up the plunger, the valving element is moved away from the injection orifice, whereby urea water is injected. Upon the energization of the coil being stopped, the plunger is pulled down by means of an internal spring force so that the valving element occludes the injection orifice, whereby the injection of urea water is stopped.

In the exhaust pipe 102 on the upstream side of the dosing valve 104, an exhaust temperature sensor 109 that measures a temperature of an exhaust gas at an entrance of the SCR device 103 (SCR entrance temperature) is provided. Also, on the upstream side of the SCR device 103 (here, the upstream side of the exhaust temperature sensor 109), an upstream-side $NO_x$ sensor 110 that detects a $NO_x$ concentration on the upstream side of the SCR device 103 is provided, and on the downstream side of the SCR device 103, a downstream-side $NO_x$ sensor 111 that detects a $NO_x$ concentration on the downstream side of the SCR device 103 is provided.

The supply module 106 includes: a supply module ("SM") pump 112 that pressure-feeds urea water; an SM temperature sensor 113 that measures a temperature of the supply module 106 (temperature of urea water flowing in the supply module 106); a urea water pressure sensor 114 that measures a pressure of the urea water in the supply module 106 (pressure on the discharge side of the SM pump 112); and a reverting valve 115 that switches between supply of urea water from the urea tank 105 to the dosing valve 104 and return of urea water in the dosing valve 104 to the urea tank 105 by switching between flow passages of urea water. Here, arrangement is made so that when the reverting valve 115 is on, the urea water from the urea tank 105 is supplied to the dosing valve 104 and when the reverting valve 115 is off, the urea water in the dosing valve 104 is returned to the urea tank 105.

When switching of the reverting valve 115 is made so that urea water is supplied to the dosing valve 104, the supply module 106 sucks up urea water in the urea tank 105 through a liquid feed line (suction line) 116 via the SM pump 112 and supplied to the dosing valve 104 through a pressure-feed line (pressure line) 117 and extra urea water is returned to the urea tank 105 through a collection line (back line) 118.

In the urea tank 105, an SCR sensor 119 is provided. The SCR sensor 119 includes: a level sensor 120 that measures a liquid level of urea water in the urea tank 105; a temperature sensor 121 that measures a temperature of the urea water in the urea tank 105; and a product quality sensor 122 that measures a product quality of the urea water in the urea tank 105. The product quality sensor 122 is configured to detect a concentration of urea water and/or whether a heterogeneous mixture is mixed in the urea water, based on, for example, an ultrasound propagation speed and/or electrical conductivity to detect a product quality of the urea water in the urea tank 105.

A cooling line 123 that circulates cooling water for cooling the engine E is connected to the urea tank 105 and the supply module 106. The cooling line 123 runs through the inside of the urea tank 105 for heat exchange between cooling water flowing in the cooling line 123 and urea water in the urea tank 105. Likewise, the cooling line 123 runs through the inside of the supply module 106 for heat exchange between the cooling water flowing in the cooling line 123 and urea water in the supply module 106.

In the cooling line 123, a tank heater valve (coolant valve) 124 that provides a switch for whether or not cooling water is supplied to the urea tank 105 and the supply module 106 is provided. Although the cooling line 123 is connected also to the dosing valve 104, arrangement is made so that cooling water is supplied to the dosing valve 104 irrespective of whether the tank heater valve 124 is opened or closed. The cooling line 123 is disposed along the liquid feed line 116, the pressure-feed line 117 and the collection line 118 through which urea water passes, which is, however, not illustrated in FIG. 1(a) for simplification of the Figure.

Figure 2:
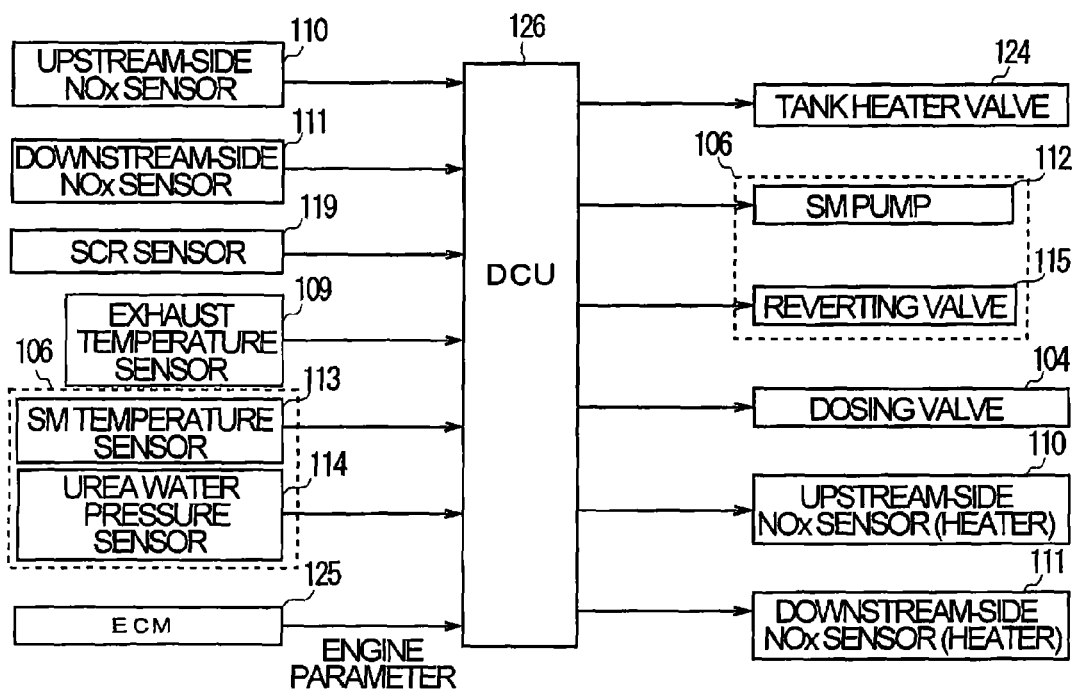
FIG. 2 is a diagram of an input/output configuration of a closing control unit ("DCU") in the SCR system in FIG. 1.

FIG. 2 is a diagram of an input/output configuration of the DCU 126.

As illustrated in FIG. 2, input signal lines from the upstream-side $NO_x$ sensor 110, the downstream-side $NO_x$ sensor 111, the SCR sensor 119 (the level sensor 120, the temperature sensor 121 and the product quality sensor 122), the exhaust temperature sensor 109, the SM temperature sensor 113 and the urea water pressure sensor 114 in the supply module 106 and an engine control module ("ECM") 125 that controls the engine E are connected to the DCU 126. From the ECM 125, signals for an external air temperature and engine parameters (e.g., engine rotation speed) are input.

From the ECM 125, a signal indicating that DPF regeneration is under way, a signal indicating that the PTO is operating, and a signal indicating that the exhaust brake is operating are input into the DCU 126. The DPF regeneration is control in which, if a quantity of PM collected by the DPF 108 becomes large (more specifically, a differential pressure between the upstream side and the downstream side of the DPF 108 exceeds a predetermined value), the exhaust gas temperature is raised by fuel injection control or the like to combust and eliminate the PM collected by the DPF 108. Moreover, the PTO is a mixer in a concrete mixer vehicle, a freezer in a freezer vehicle and the like, for example.

Also, output signal lines to the tank heater valve 124, the SM pump 112 and the reverting valve 115 in the supply module 106, the dosing valve 104, a heater for the upstream-side $NO_x$ sensor 110 and a heater for the downstream-side $NO_x$ sensor 111 are connected to the DCU 126. Here, input/output of signals between the DCU 126 and the respective members may be made via the individual signal lines or a controller area network ("CAN").

On the DCU 126, a urea water injection control unit 127 that controls an injected quantity of urea water in accordance with a detected value of the NOx concentration detected by the upstream-side NOx sensor 110 is installed. The urea water injection control unit 127 is configured to estimate a quantity of NOx in an exhaust gas on the basis of a signal for the engine parameters from the ECM 125 and an exhaust gas temperature from the exhaust temperature sensor 109, determine a quantity of urea water to be injected from the dosing valve 104 on the basis of the estimated quantity of NOx in the exhaust gas, and furthermore, when the determined quantity of urea water is injected via the dosing valve 104, control the dosing valve 104 on the basis of the detected value of the upstream-side NOx sensor 110 to adjust the quantity of urea water injected via the dosing valve 104.

The SCR system 100 is provided with a NOx sensor diagnosis device 1 that diagnoses validity of the upstream-side NOx sensor 110. The SCR system 100 is provided with the two NOx sensors 110 and 111, but the NOx sensor diagnosis device 1 diagnoses validity of the upstream-side NOx sensor 110 provided on the upstream side of the SCR device 103.

Figure 1B:
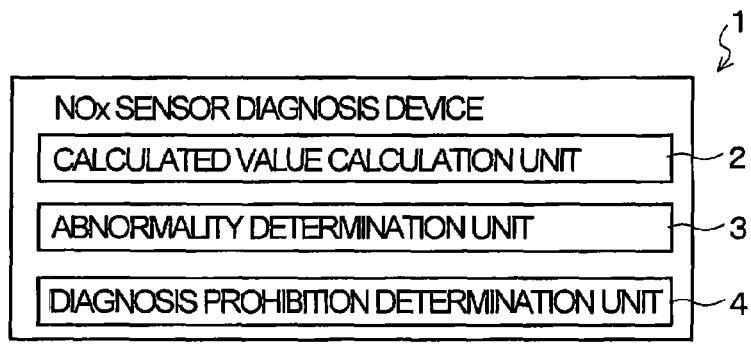

As illustrated in FIG. 1(*b*), the NOx sensor diagnosis device 1 includes: a calculated value calculation unit 2 that acquires a calculated value of the NOx concentration in the exhaust gas on the basis of the operation state of the engine E (on the basis of the engine parameter from the ECM 125), an abnormality determination unit 3 that determines that the upstream-side NOx sensor 110 is abnormal if a difference between the calculated value of the NOx concentration acquired by the calculated value calculation unit 2 and the detected value of the NOx concentration detected by the upstream-side NOx sensor 110 becomes larger than a threshold value for determination, and a diagnosis prohibition determination unit 4 that prohibits diagnosis of the upstream-side NOx sensor 110 if at least one of DPF regeneration, PTO operation and exhaust brake operation is detected. The calculated value calculation unit 2, the abnormality determination unit 3, and the diagnosis prohibition determination unit 4 are installed on the DCU 126.

The abnormality determination unit 3 is configured to determine that the upstream-side NOx sensor 110 is abnormal if a ratio between the calculated value of the NOx concentration and the detected value of the NOx concentration (detected value of the NOx concentration/calculated value of the NOx concentration) goes out of a threshold value range for determination. The abnormality determination unit 3 is configured to give a warning to a driver by turning on a warning lamp (CEL (Check Engine Lamp) or MIL (Malfunction Indicator Lamp)), not shown, if it determines that the upstream-side NOx sensor 110 is abnormal. The threshold value for determination used by the abnormality determination unit 3 is set as appropriate by experiments or the like.

The diagnosis prohibition determination unit 4 is configured to prohibit diagnosis by the abnormality determination unit 3 if it receives a signal from the ECM 125 indicating that DPF regeneration is under way, if it receives a signal indicating that the PTO is operating or if it receives a signal indicating that the exhaust brake is operating.

Subsequently, a control flow of the NOx sensor diagnosis device 1 will be described by using FIG. 3.

Figure 3:
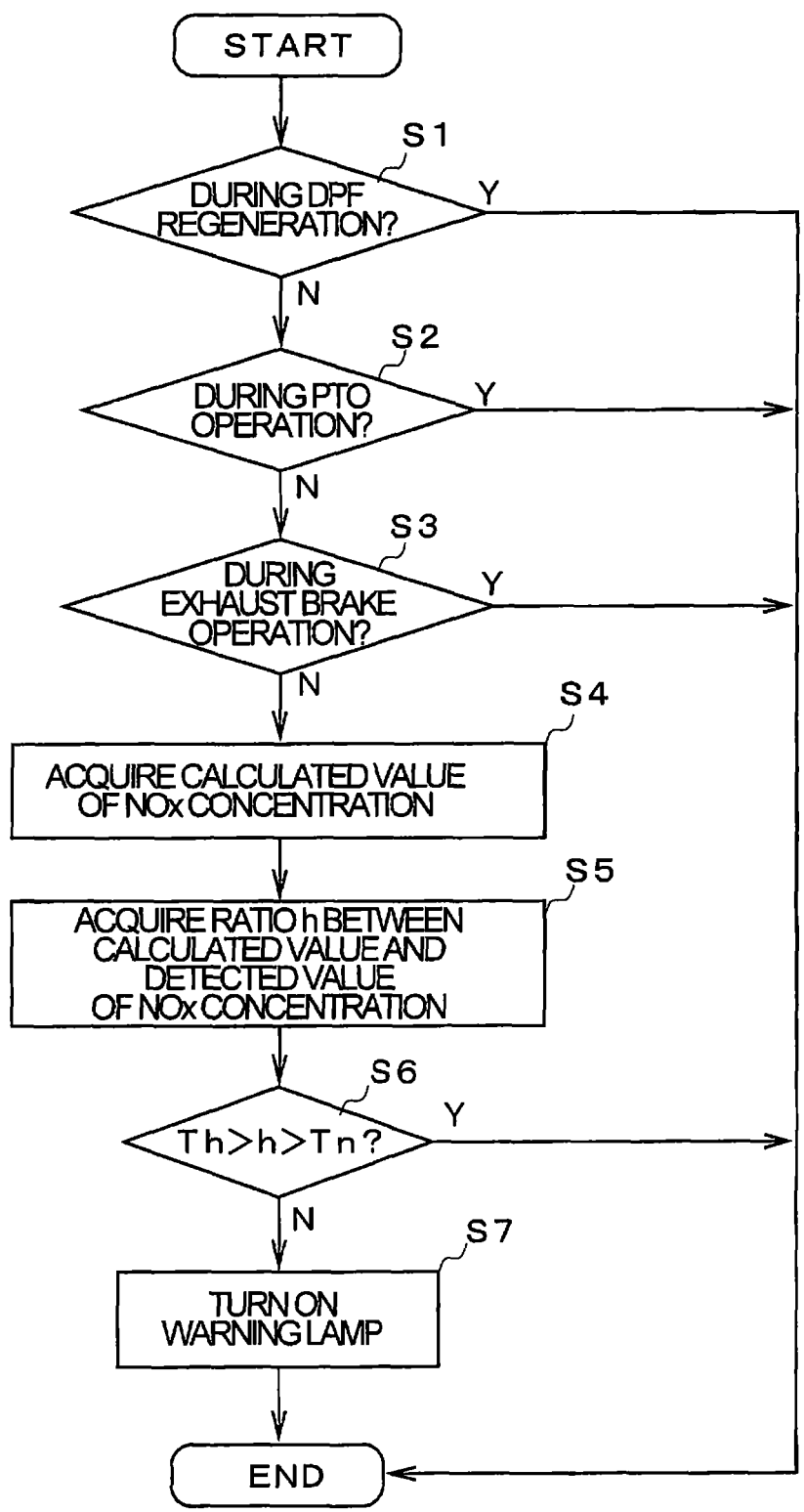
FIG. 3 is a flowchart illustrating a control flow for the NOx sensor diagnosis device in the present invention.

As illustrated in FIG. 3, first, at Step S1, the diagnosis prohibition determination unit 4 determines whether the DPF regeneration is under way or not (that is, whether the signal indicating that the DPF regeneration is under way has been received from the ECM 125 or not). If it is determined to be YES at Step S1, the DPF regeneration is under way, and the control is finished without diagnosing the upstream-side NOx sensor 110.

If it is determined to be NO at Step S1, at Step S2, the diagnosis prohibition determination unit 4 determines whether the PTO is operating or not (that is, the signal indicating that the PTO is operating has been received from the ECM 125 or not). If it is determined to be YES at Step S2, the PTO is operating, and the control is finished without diagnosing the upstream-side NOx sensor 110.

If it is determined to be NO at Step S2, at Step S3, the diagnosis prohibition determination unit 4 determines whether the exhaust brake is operating or not (that is, the signal indicating that the exhaust brake is operating has been received from the ECM 125 or not). If it is determined to be YES at Step S3, the exhaust brake is operating, and the control is finished without diagnosing the upstream-side NOx sensor 110.

If it is determined to be NO at Step S3, at Step S4, the calculated value calculation unit 2 acquires the calculated value of the NOx concentration on the basis of the signal for the engine parameter from the ECM 125.

After the calculated value of the NOx concentration is acquired, at Step S5, the abnormality determination unit 3 reads a detected value of the NOx concentration from the upstream-side NOx sensor 110 and acquires a ratio h between the calculated value and the detected value of the NOx concentration from the read detected value of the NOx concentration and the calculated value of the NOx concentration acquired at Step S4.

At Step S6, the abnormality determination unit 3 determines whether the ratio h between the calculated value and the detected value of the NOx concentration acquired at Step S5 is within a range of a threshold value for determination (smaller than an upper limit threshold value Th and larger than a lower limit threshold value Tn). If it is determined to be YES at Step S6, the upstream-side NOx sensor 110 is considered to be normal, and the control is finished as it is.

If it is determined to be NO at Step S6, abnormality is considered to have occurred in the upstream-side NOx sensor 110, and thus, the abnormality determination unit 3 turns on the warning lamp such as CEL and MIL (Step S7) and finishes the control.

As described above, in the NOx sensor diagnosis device 1 according to this embodiment, the diagnosis of the upstream-side NOx sensor 110 is prohibited during the DPF regeneration, the PTO operation or the exhaust brake operation.

During the DPF regeneration, the PTO operation or the exhaust brake operation, since the exhaust gas flow rate or the NOx concentration in the exhaust gas rapidly changes, the upstream-side NOx sensor 110 does not operate normally in some cases, but in this embodiment, the diagnosis of the upstream-side NOx sensor 110 is not made under such circumstances, and there is no concern of erroneous diagnosis that abnormality occurs in the upstream-side NOx sensor 110 regardless of no abnormality in the upstream-side NOx sensor 110.

The present invention is not limited to the above embodiments but it is needless to say that various changes can be made within a range not departing from the gist of the present invention.

For example, as a value indicating the difference between the calculated value and the detected value of the NOx concentration, the ratio between the calculated value and the detected value of the NOx concentration (detected value of the NOx concentration/calculated value of the NOx concentration) is described, but this is not limiting, and a difference between the calculated value and the detected value of the NOx concentration (absolute value) may be used.

Moreover, the diagnosis of the upstream-side NOx sensor 110 was described, but this is not limiting, and the present invention can be applied also to the downstream-side NOx sensor 111. That is, the diagnosis of the downstream-side NOx sensor 111 may be prohibited during the DPF regeneration, the PTO operation or the exhaust brake operation.

The invention claimed is:

1. A NOx sensor diagnosis device which is provided in an exhaust pipe of an engine and diagnoses a NOx sensor for detecting a NOx concentration in an exhaust gas, comprising:
    a diagnosis prohibition determination unit that prohibits diagnosis of the NOx sensor when a power take-off operation is detected.

2. The NOx sensor diagnosis device according to claim 1, further comprising:
    a calculated value calculation unit that acquires a calculated value of the NOx concentration in the exhaust gas on the basis of an operation state of the engine; and
    an abnormality determination unit that determines that the NOx sensor is abnormal if a difference between the calculated value of the NOx concentration acquired by the calculated value calculation unit and a detected value of the NOx concentration detected by the NOx sensor becomes larger than a threshold value for determination.

3. The device according to claim 1, where the NOx sensor is located upstream of a selective catalytic reduction device.

4. The device according to claim 1, where the NOx sensor is located downstream of a selective catalytic reduction device.

5. A selective catalytic reduction system comprising:
    a selective catalytic reduction device provided in an exhaust pipe of an engine;
    a dosing valve that injects urea water on an upstream side of the selective catalytic reduction device;
    a NOx sensor provided on the upstream side of the selective catalytic reduction device for detecting NOx concentration in an exhaust gas;
    a urea water injection control unit that controls a urea water injection amount in accordance with a detected value of the NOx concentration detected by the NOx sensor; and
    a NOx sensor diagnosis device that diagnoses the NOx sensor,
    wherein the NOx sensor diagnosis device is provided with a diagnosis prohibition determination unit that prohibits diagnosis of the NOx sensor if a power take-off operation,is detected.

6. The selective catalytic reduction system according to claim 5,
    wherein the NOx sensor diagnosis device is provided with:
    a calculated value calculation unit that acquires a calculated value of the NOx concentration in the exhaust gas on the basis of an operation state of the engine; and
    an abnormality determination unit that determines that the NOx sensor is abnormal if a difference between the calculated value of the NOx concentration acquired by the calculated value calculation unit and a detected value of the NOx concentration detected by the NOx sensor becomes larger than a threshold value for determination.

7. The system according to claim 5, where the NOx sensor is located upstream of the selective catalytic reduction device.

8. The system according to claim 5, where the NOx sensor is located downstream of the selective catalytic reduction device.

* * * * *